United States Patent

Yamagata

[11] Patent Number: 6,014,279
[45] Date of Patent: *Jan. 11, 2000

[54] ERASING DEVICE HAVING A PLURALITY OF ERASING MODES

[75] Inventor: Shigeo Yamagata, Yokohama, Japan

[73] Assignee: Canon Kabushiki Kaisha, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/347,194

[22] Filed: Nov. 21, 1994

Related U.S. Application Data

[63] Continuation of application No. 08/032,194, Mar. 15, 1993, abandoned, which is a continuation of application No. 07/575,871, Aug. 31, 1990, abandoned.

[30] Foreign Application Priority Data

Aug. 31, 1989 [JP] Japan .................................. 1-225139

[51] Int. Cl.⁷ ....................................................... G11B 5/03
[52] U.S. Cl. .................................. 360/66; 360/57; 360/69
[58] Field of Search .................................. 360/66, 57, 60, 360/69, 75; 307/31, 390, 592, 600; 327/261, 263, 392, 393; 386/63

[56] References Cited

U.S. PATENT DOCUMENTS

| | | | |
|---|---|---|---|
| 4,636,905 | 1/1987 | Morimoto et al. | 360/75 |
| 4,670,799 | 6/1987 | Ogura et al. | 360/66 |
| 4,685,789 | 8/1987 | Kawamura et al. | 354/173.11 |
| 4,689,698 | 8/1987 | Ishikawa et al. | 360/69 |
| 4,725,902 | 2/1988 | Oda et al. | 360/66 |
| 4,740,846 | 4/1988 | Ogawa | 360/66 |
| 4,943,867 | 7/1990 | Suetaka et al. | 358/342 |
| 5,016,124 | 5/1991 | Fukushima et al. | 360/73.03 |
| 5,570,245 | 10/1996 | Fukushima | 360/66 |

FOREIGN PATENT DOCUMENTS

| | | |
|---|---|---|
| 56-107226 | 8/1981 | Japan . |
| 65-51001 | 3/1987 | Japan . |
| 62-188003 | 8/1987 | Japan . |
| 1-79903 | 3/1989 | Japan . |
| 1112507 | 5/1989 | Japan . |
| 2-153332 | 6/1990 | Japan . |

*Primary Examiner*—Andrew L. Sniezek
*Assistant Examiner*—Alan Faber
*Attorney, Agent, or Firm*—Fitzpatrick, Cella, Harper & Scinto

[57] ABSTRACT

An erasing device includes a first erasing mode for erasing the signal of an area of a recording medium, and a second erasing mode for erasing the signal of designated plural areas. The erasing operation in the first or second erasing mode is rendered possible as long as a necessary power supply is available, by selecting the limit power source voltage prohibiting the start of operation in the second erasing mode to be equal to or higher than the power source voltage prohibiting the start of operation of the first erasing mode, and also selecting the limit power source voltage prohibiting the continuation of operation in the second erasing mode, in the course of erasing operation in the second erasing mode, lower than the power source voltage prohibiting the start of operation of the first erasing mode. Also the operation can escape from the second erasing mode in suitable manner if the power supply becomes deficient in the course of operation in the second erasing mode.

3 Claims, 7 Drawing Sheets

ERASING DEVICE HAVING A PLURALITY OF ERASING MODES

This application is a continuation of application Ser. No. 08/032,194 filed Mar. 15, 1993, which is a continuation of Ser. No. 07/575,871 filed Aug. 31, 1990, both now abandoned.

BACKGROUND OF THE INVENTION

1. Field of the Invention

The present invention relates to an erasing device for use in a recording/reproducing apparatus.

2. Related Background Art

Various image recording/reproducing apparatus, such as video tape recorders and electronic still cameras have rapidly become popular in recent years. These apparatus are required to be small and compact and to be capable of battery operation because they are often used outdoors.

Such recording/reproducing apparatus basically have a recording mode, a reproducing mode and an erasing mode for erasing an unnecessary recorded signal. Since such modes are different in electric power consumption, it is desirable to monitor the output of the electric power supply in advance and to prohibit a mode if the power supply voltage required for said mode is not available, in order to prevent power supply deficiency in the course of an operation. Consequently, in the conventional recording/reproducing apparatus there is customarily defined a power source voltage for prohibiting the operation (hereinafter called limit voltage) for each operating mode.

However, in the conventional apparatus there is only defined a single limit voltage for each of the recording, reproducing and erasing modes. Consequently, even if the power source voltage is above the corresponding limit voltage at the start of an operation, it may become lower than the limit voltage in the course of operation, thereby resulting in a defective or erroneous operation. For example, certain electronic still cameras are provided, in addition to a single erasing mode for erasing the signal of individual track of the magnetic disk constituting the recording medium, with an all-track erasing mode for erasing all the tracks of the magnetic disk and/or a designated range erasing mode for erasing all the tracks in a designated range.

In such case, if a same limit voltage, for example enough for erasing all the tracks, is used for all the erasing modes, the erasing of a single track can only be achieved with the battery immediately after charging or immediately after the start of use.

SUMMARY OF THE INVENTION

In consideration of the foregoing, an object of the present invention is to provide an erasing device not associated with the above-mentioned drawbacks.

Another object of the present invention is to provide an erasing device capable of appropriately effecting the above-mentioned operations.

Still another object of the present invention is to provide an erasing device capable of securely erasing plural areas in continuous manner.

The foregoing objects can be attained, according to a preferred embodiment of the present invention, by an erasing device having a first erasing mode for erasing the signal of a designated area of the recording medium and a second erasing mode for erasing the signal of plural designated areas, wherein the power source voltage prohibiting the start of the operation of said second erasing mode is selected equal to or higher than the power source voltage prohibiting the start of the operation of said first erasing mode, and the power source voltage prohibiting the continuation of the operation of said second erasing mode in the course of said operation is selected smaller than the power source voltage prohibiting the start of the operation of said first erasing mode, whereby the first or second erasing mode can be executed as long as necessary power supply is available, and the operation can escape from the second erasing mode in a suitable manner if the power supply becomes deficient in the course of the operation in said second erasing mode.

Still another object of the present invention is to provide a device capable of secure execution of repetition of a single operation.

The foregoing and still other objects of the present invention, and the advantages thereof, will become fully apparent from the following description of embodiments, to be taken in conjunction with the attached drawings.

DETAILED DESCRIPTION OF THE PREFERRED EMBODIMENTS

Now the present invention will be clarified in detail by an embodiment thereof shown in the attached drawings.

Figure 1:
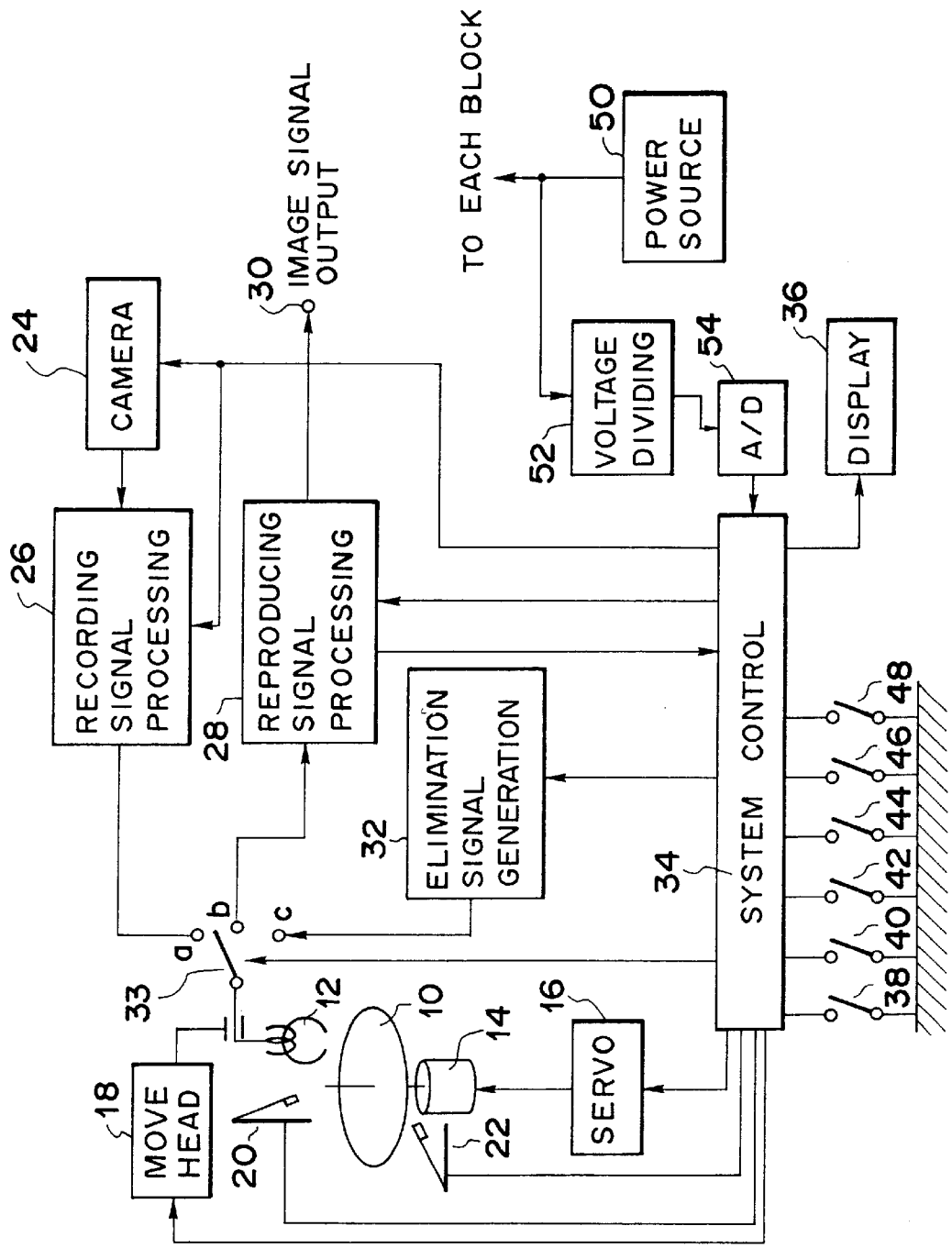
FIG. 1 is a block diagram of an embodiment of the device of the present invention.
Figure 2:
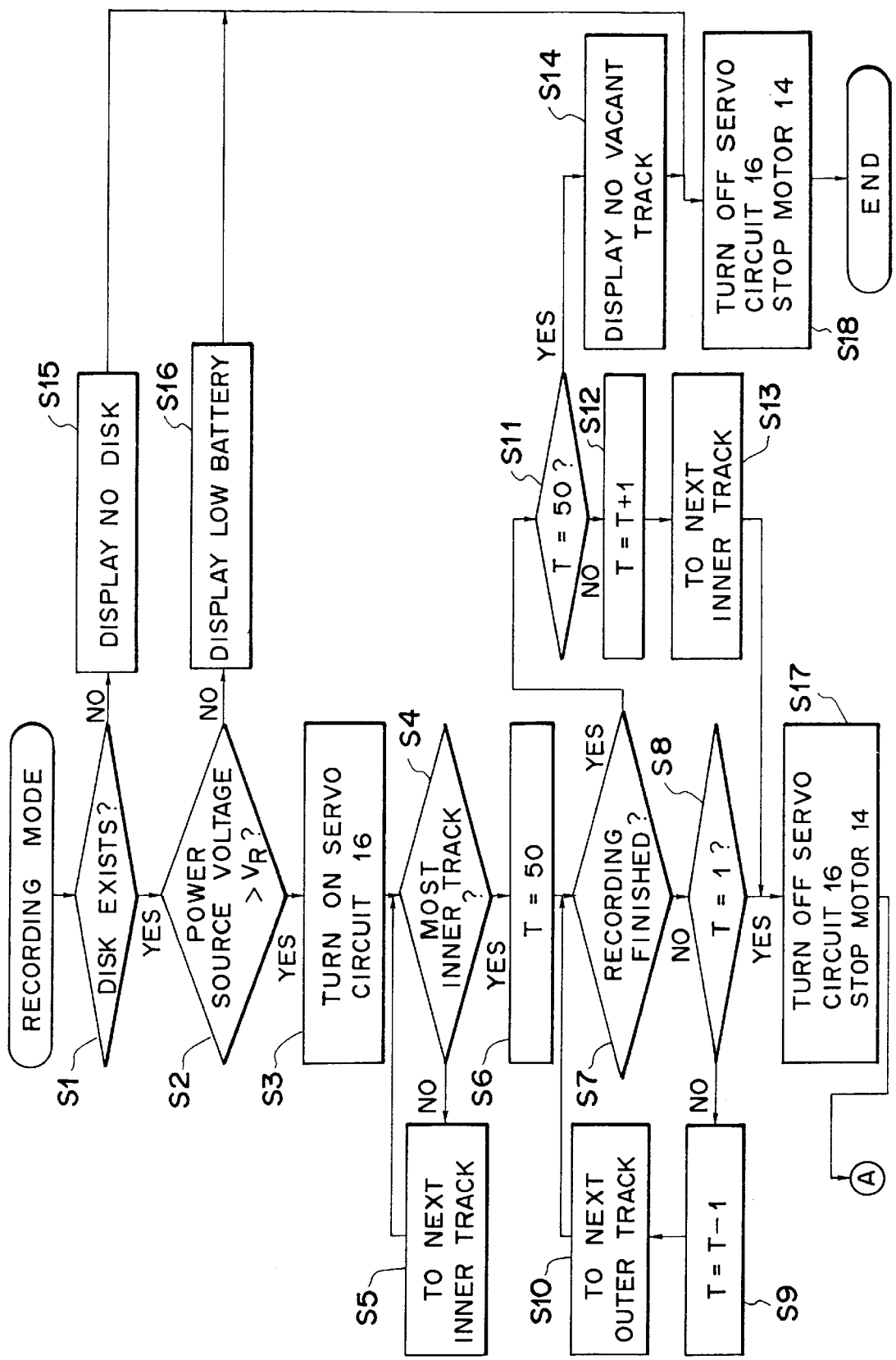
FIGS. 2 and 3 are flow charts of control sequence of a recording mode.

FIG. 1 is a block diagram of an embodiment of the erasing device of the present invention, applied to an electronic still camera, wherein shown are a magnetic disk 10 having fifty recording tracks numbered from 1 to 50 starting from the outermost track; a magnetic head 12 for recording, reproduction and erasure; a motor 14 for rotating the magnetic disk 10; a servo circuit 16 for controlling the revolution of the motor 14 at a predetermined value; a head moving mechanism 18 for moving the magnetic head 12 in the radial direction of the magnetic disk 10 and positioning the magnetic head 12 on a designated track; an innermost track detection switch 20 to be closed when the magnetic head 12 is positioned on the innermost track; and a disk detection switch 22 for detecting that the magnetic disk 10 is set.

There are also provided a camera circuit 24 provided with a phototaking optical system, a diaphragm, a shutter and an image sensor for outputting a photographed image signal; a recording signal process circuit 26 for converting the output signal of the camera circuit 24 by a suitable process such as frequency modulation into a signal suitable for recording on the magnetic disk 10; a reproducing signal process circuit 28 for applying a suitable process such as frequency demodulation to the reproduced output from the magnetic head 12 thereby obtaining the image signal at an image output terminal 30; an erasing signal generating circuit 32 for generating an erasing signal; and a selector switch 33 to be connected to a contact a, b or c respectively in recording, reproduction or erasing.

There are further provided a system control circuit 34 for controlling the above-mentioned units as will be explained later; a display unit 36 for displaying the status of the units' function; a recording/reproduction mode switch 38 for setting the recording mode or the reproduction mode; a recording execution switch 40 for instructing the execution of recording; an erasing mode switch 42 for setting the erasing mode; a single/all erasing switch 44 for selecting the signal track erasing or all track erasing; a forward switch 46 for moving the magnetic head toward the inner track; and a reverse switch 48 for moving the magnetic head toward the outer track.

There are further provided a power source battery 50 for supplying various units with electric power; a voltage dividing circuit 52 for dividing the output voltage of the battery 50 to ¼; and an A/D converter 54 for digitizing the output of the voltage dividing circuit 52.

The function of the above-explained circuit will be explained in the following, with reference to FIGS. 2 to 6. It is assumed that the recording mode is set by the recording/reproduction mode switch 38. The system control circuit 34 detects the presence or absence of the magnetic disk 10 by the detection switch 22 (S1), then, if absent, causes the display unit 36 to display the absence of the magnetic disk (S15), turns off the servo circuit 16 and stops the motor 14 whereby the sequence is terminated (S18). On the other hand, if the magnetic disk 10 is present (S1), there is discriminated, from the output of the A/D converter 54, whether and output voltage of the power source battery 50 is higher than a limit voltage $V_R$ for the recording mode (S2), and, if it is lower than said limit voltage, there is displayed a low battery state (S16). Then the servo circuit 16 is turned off and the motor 14 is stopped whereby the sequence is terminated (S18).

If the output voltage of the power source battery 50 is higher than the limit voltage $V_R$ of the recording mode (S2), the servo circuit 16 is activated to rotate the magnetic disk 10 at a predetermined speed (S3), and the magnetic head 12 is positioned on the innermost track (S4, S5). More specifically, the magnetic head 12 is moved inwards by the head moving mechanism 18 (S5) until the innermost track detection switch 20 is closed (S4). When said switch is closed (S4), a track number variable T is set at "50" (S6), then the switch 33 is connected to the contact b, and the reproducing signal process circuit 28 discriminates whether the track is recorded or unrecorded (S7). More specifically, the reproducing signal process circuit 28 discriminates the recorded or unrecorded state of the track by envelope detection of the signal reproduced from the track and comparing the result of said detection with a predetermined level, and sends the result of said discrimination to the system control circuit 34. The system control circuit 34 stores the recorded/unrecorded state of each track in an incorporated memory.

If the track is unrecorded, the magnetic head 12 is moved outwards by decreasing the variable T (S9, S10) until a recorded track is detected (S7) or the outermost track (T=1) is reached (S8). If a recorded track is detected (S7) and if said track is not the innermost track (T=50) (S11), the variable T is increased (S12), then the magnetic head 12 is moved by one track to the inside (S13), then the servo circuit 16 is turned off and the motor 14 is stopped (S17). If the recorded track cannot be found until T=11 is reached (S8), all the tracks are unrecorded, so that the servo circuit 16 is turned off and the motor 14 is stopped (S17). Through the above-explained procedure, the magnetic head 12 is positioned on an unrecorded track immediately inside the innermost recorded track. The display unit 36 is provided with a display area for the track number, and constantly displays the variable T, whereby the operator can constantly know the access position of the magnetic head and the remaining number of tracks available for image recording.

If the recorded track is the innermost track (T=50) (S11), the display unit 36 displays the absence of vacant track, then the servo circuit 16 is turned off and the motor 14 is stopped whereby the sequence is terminated (S18).

Figure 3:
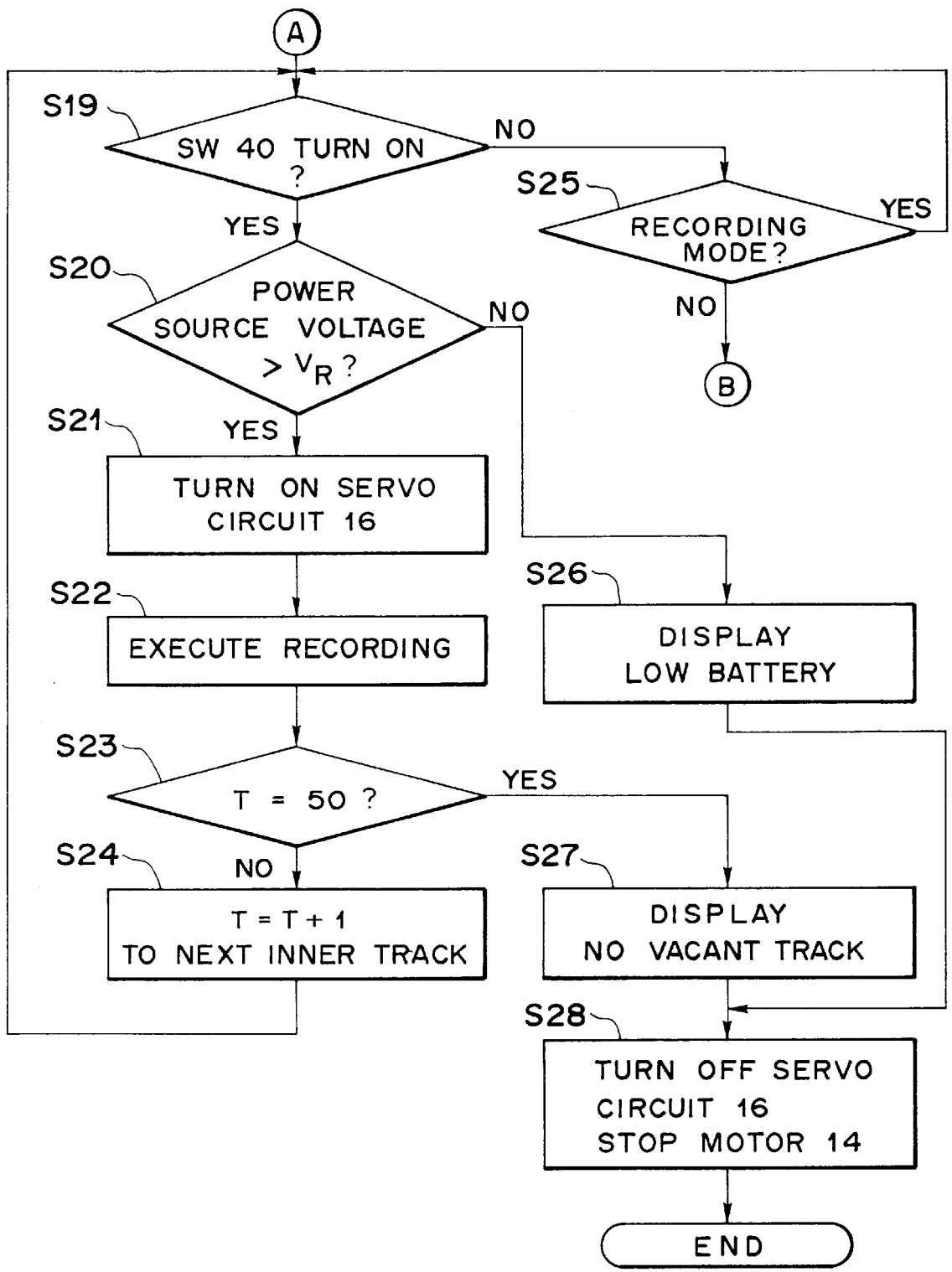

After the step S17, the sequence proceeds to a flow diagram in FIG. 3, and awaits the closing of the recording execution switch 40 (S19). If the recording/reproduction mode switch 38 is shifted away from the recording mode in the meantime (S25), the sequence branches to a step S37 in FIG. 4. When the recording execution switch 40 is turned on, there is discriminated whether the power source voltage is larger than $V_R$ (S20), and, if not, the execution of recording is prohibited. Thus a low battery state is displayed (S26), then the servo circuit 16 is turned off and the motor 14 is stopped whereby the sequence is terminated (S28). If the power source voltage is larger than $V_R$ (S20), the servo circuit 16 is activated to rotate the magnetic disk 10 at a predetermined speed by the motor 14 (S21), and the camera circuit 24 is controlled to release the image signal of a field. The recording signal process circuit 26 processes said image signal, and the output of said circuit is supplied through the switch 33 to the magnetic head 12 and recorded on the magnetic disk 10 (S22). The system control circuit 34 connects the switch 33 to the contact a during a period necessary for recording, and then connects it to the contact b.

After the execution of recording (S22), there is discriminated whether the track is the innermost one (T=50) (S23). If T=50, the absence of vacant track is displayed (S27), then the servo circuit 16 is turned off and the motor 14 is stopped whereby the sequence is terminated (S28). If T≠50, the variable T is increased to move the magnetic head 12 by a track toward the inside (S24), and the actuation of the recording execution switch is again awaited (S19).

Figure 4:
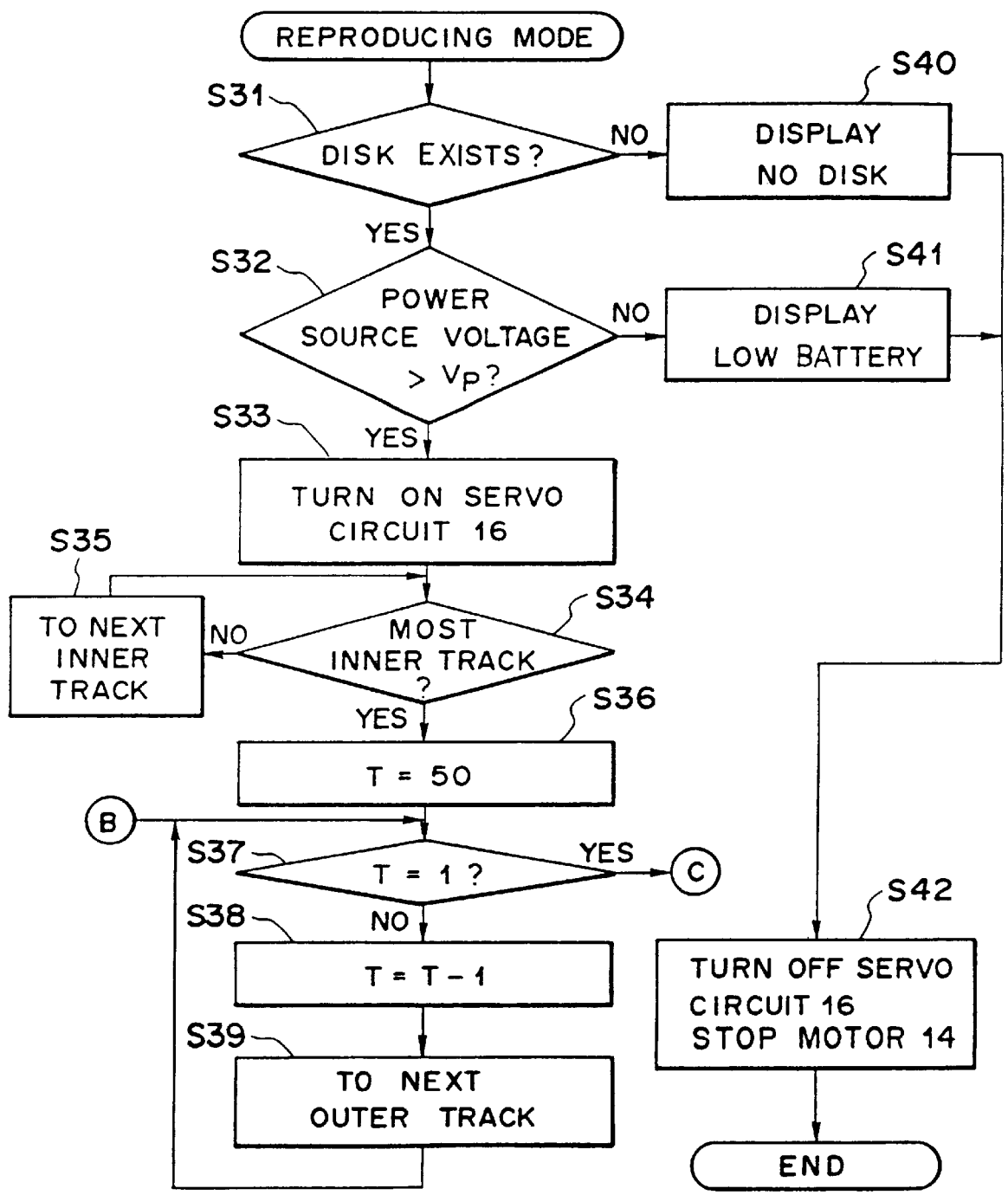
FIGS. 4 and 5 are flow charts of control sequence of a reproducing mode.

In the following there will be explained the function of the reproduction mode, with reference to FIGS. 4 and 5. The system control circuit 34 detects, by the detection switch 22, the presence or absence of the magnetic disk 10 (S31), and, if absent, causes the display unit 36 to display the absence of magnetic disk (S40), and turns off the servo circuit 16 and the motor 14, thereby terminating the sequence (S42). If the magnetic disk 10 is present (S31), there is discriminated, from the output of the A/D converter 54, whether the output voltage of the power source battery 50 is higher than a limit voltage $V_P$ for the reproduction mode (S32), and, if it is lower, a low battery state is displayed (S41), and the servo circuit 16 and the motor 14 are turned off whereby the sequence is terminated (S42).

If the output voltage of the power source battery 50 is higher than the limit voltage $V_P$ for the reproduction mode (S32), the servo circuit 16, is activated (S33) and the magnetic head 12 is positioned on the innermost track (S34, S35). More specifically, the magnetic head 12 is moved inwards by the head moving mechanism 18 (S35) until the innermost track detection switch 20 is closed (S34). When said switch is closed (S34), the variable T is set at "50" (S36), and the magnetic head 12 is moved stepwise outwards until the outermost track (T=1) is reached (S37, S38, S39). Thus the initialization for the reproduction mode is completed, and the magnetic head is positioned for reproducing the signal of the 1st track.

When the outermost track (T=1) is reached (S37), there are monitored the states of the forward switch 46, reverse switch 48, erasing mode switch 42 and recording/ reproduction mode switch 38 (S43–S46), and there is also monitored the power source voltage (S47). If the forward switch 46 is on (S43), and if the track is not the innermost one (T=50) (S48), the variable T is increased to move the magnetic head 12 by a track inwards (S49). If the reverse switch 48 is on (S44), and if the track is not the outermost one (T=1) (S50), the variable T is decreased to move the magnetic head 12 outwards by a track (S51). If the erasing mode switch 42 is on (S45), there is conducted an erasing operation (S52), as will be explained later. If the record/reproduction mode switch 38 selects the recording mode, the sequence proceeds to the step S4 (S46). If the power source voltage does not exceed the limit voltage $V_P$ for the reproduction mode, a low battery state is displayed (S53), and the servo circuit 16 and the motor 14 are turned off to terminate the sequence (S54).

Figure 6:
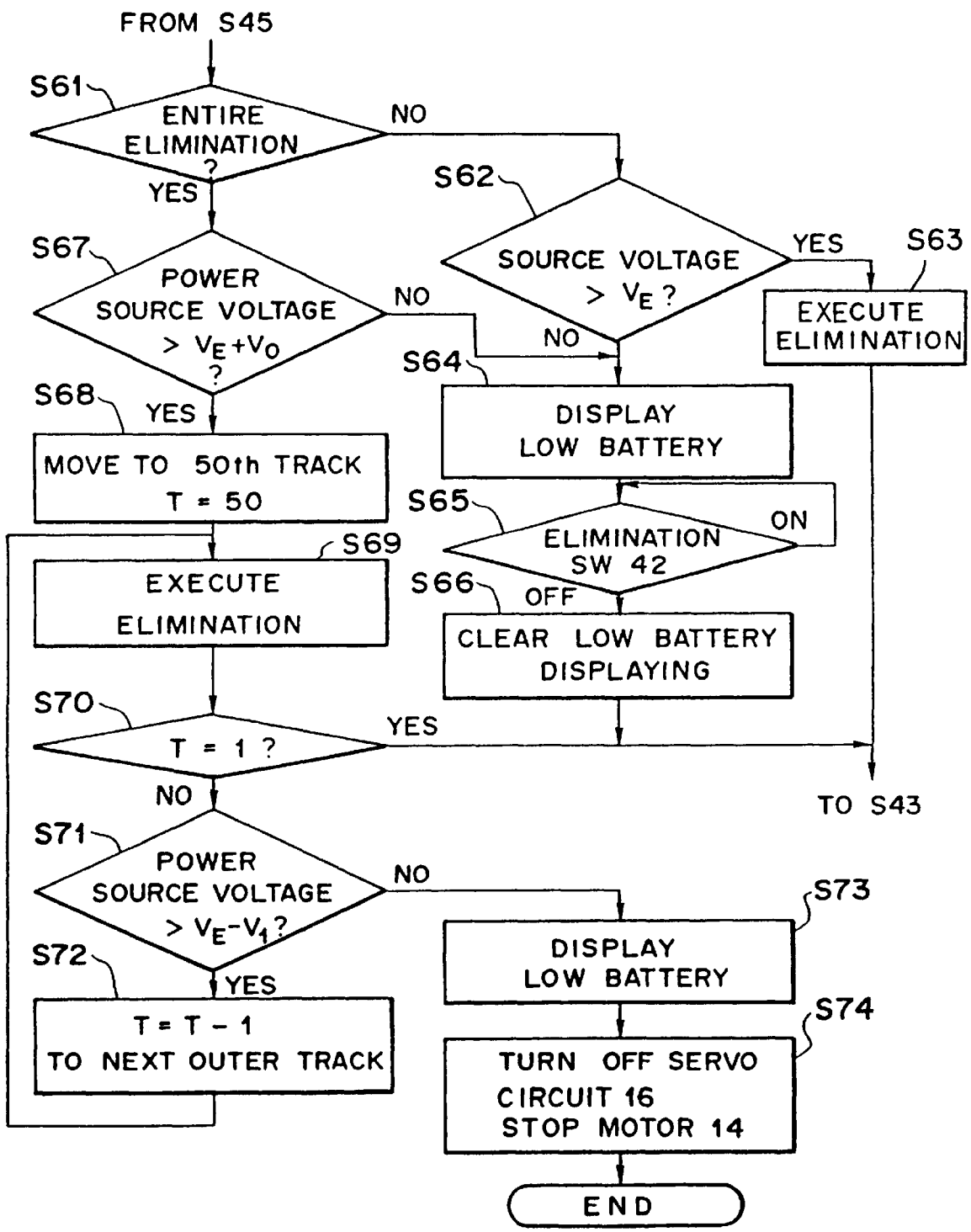
FIG. 6 is a flow chart of an erasing operation.
Figure 7:
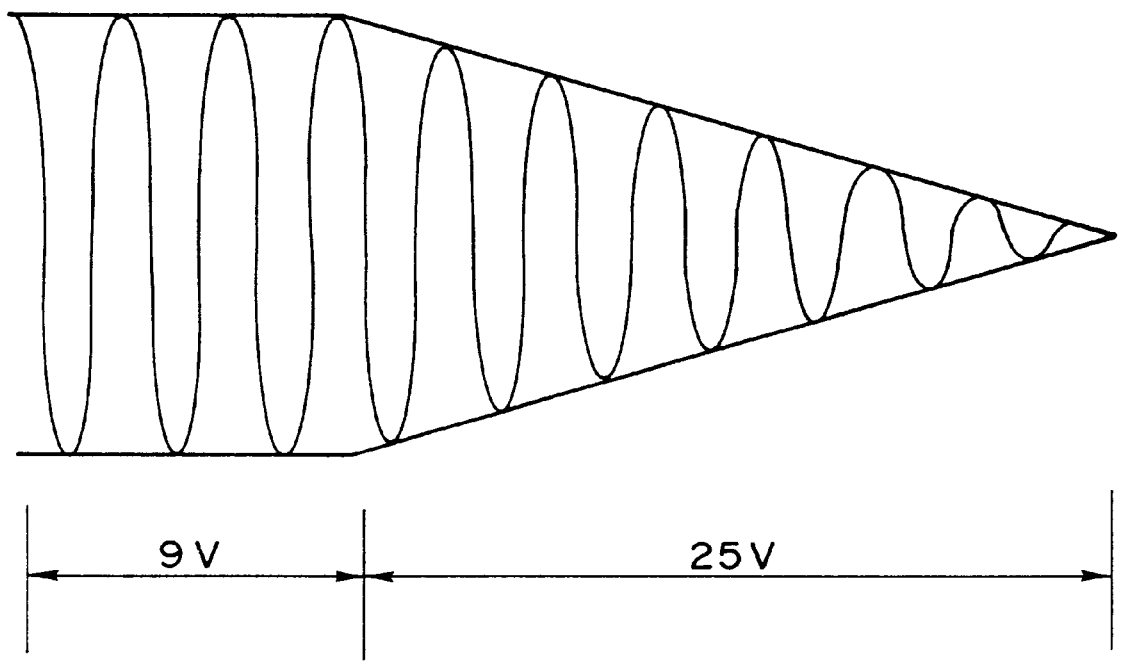
FIG. 7 is a wave form chart showing an erasing signal.

Now the erasing operation of the step S52 will be explained with reference to FIG. 6. At first there is discriminated, by the single/all erasing switch 44, whether all track erasing mode is selected (S61), and, if not, there is discriminated whether the power source voltage is larger than a limit voltage VE for the single track erasure (S62). If it is larger, the erasing operation is conducted on the current track (S63) and the sequence returns to the step S43. Said erasing operation is conducted in the following manner. The system control circuit 34 connects the switch 33 to the contact c, and causes the erasing current generator 32 to generate an erasing signal shown in FIG. 7. Said erasing signal has a frequency of 10 KHz, of which amplitude remains constant for a period of 9V (V being vertical synchronization period) and then attenuates to zero in a period of 25V. The erasing operation of a track is completed when the amplitude of the erasing signal is reduced to zero, whereupon the system control circuit 34 again connects the switch 33 to the contact b. As the signal of the erased track is supplied to the reproduced signal process circuit 28, the terminal 38 releases white noise.

If the power source voltage is not higher than the limit voltage $V_E$ in the single track erasing mode (S62), or if the power source voltage is not higher than a predetermined value $V_E+v_0$ (S67), a low battery state is displayed (S64). Then, when the erasing mode switch 42 is turned off (S65), the display of the low battery state is turned off (S66) and the sequence returns to the step S43. The abovementioned value $v_0$ is selected positive. If the power source voltage is larger than the predetermined value $V_E+v_0$ in the all-track erasing mode (S67), the magnetic head 12 is moved to the innermost 50th track (S68) and said track is erased (S69). Then the magnetic head 12 is stepwise moved outwards by a track (S72) and the erasing of the current track is conducted (S69) until the outermost track (T=1) is reached (S70) or until the power source voltage becomes equal to or lower than $V_E-v_1$ (S71), wherein $v_1$ is a positive value. When the erasing proceeds to the outermost track (S70), the sequence returns to the step S43. Also if the power source voltage becomes equal to or lower than $V_E-v_1$ in the course of stepwise erasures of the tracks (S71), there is displayed the low battery state (S73) and the servo circuit 16 and the motor 14 are turned off, whereby the sequence is terminated (S74). Thus the erasure of all the tracks may be interrupted (S71) in case the battery repeats charging and discharging by a predetermined number of times or in case the power source voltage suddenly drops for example by a change in the temperature.

In the present embodiment, $V_R$, $V_P$ and $V_E$ are so selected as to satisfy $V_R<V_P<V_E$, so that the recording of several tracks is possible even when the erasing or reproduction is prohibited. On the other hand, the power source voltage limiting the start of erasure of all the tracks is determined by the level of the power source voltage at the end of said erasure, namely whether said level is to be selected at least equal to $V_P$, or lower than $V_P$ but larger than $V_R$. Even when $v_0$ is zero, the present device will be free from erroneous operation or imperfect erasure as long as the power source voltage is not lower than $V_R$ at the end of erasure of all the tracks. Stated differently, if the priority is to be given to the all-track erasure rather than the reproduction or recording, the value $v_0$ can be selected as zero.

An AC adaptor for converting an AC voltage into a DC voltage may be employed as the power source. In such case there may be provided means for detecting the use of such AC adaptor, and the values $v_0$ and $V_1$ can be set at zero in the use of AC adaptor and at predetermined positive values in the use of battery. In this manner the capacity of the AC power source need not be made unnecessarily large.

In the foregoing there has been explained the erasure of all the tracks, but the present embodiment is likewise applicable to the erasure of all the plural tracks in a designated range.

As will be easily understandable from the foregoing description, the present embodiment enables the erasure of a single track and all or plural tracks as long as a necessary power source voltage for each erasing operation is available.

In the present embodiment, the erasing operation and the recording operation are two separate modes which are completely selectively executed, but the present invention is not limited to such embodiment and is applicable also to an apparatus in which the erasing operation and the recording operation are conducted in parallel manner.

For example, in an apparatus capable of selecting a mode for effecting the erasing operation and the recording operation in parallel manner continuously over plural tracks, or a reproduction mode, the respectively corresponding limit voltages $V_{ER}$ and $v_P$ can be so selected as to satisfy a relation $V_P<V_{EP}$.

Also in the present embodiment, the detection of the power source voltage is achieved by direction A/D conversion thereof, but it may also be achieved by another suitable method, such as the measurement of voltage drop across a suitable load, or the direct or indirect measurement of the current flowing in a load.

Also the present embodiment is not limited to the erasure of a single track or all or plural tracks and the corresponding limit voltages, but the present invention is likewise applicable to the recording of a single track or all or plural tracks.

Furthermore, the present invention is not limited to the foregoing embodiment but is subject to various modifications within the scope and spirit of the appended claims.

I claim:

1. An information signal recording apparatus for recording an information signal on a recording medium and being coupleable to a power supply, said apparatus comprising:

erasing mode setting means having a first erasing mode for setting said recording medium in a condition that an information signal having a first information amount is permitted to be recorded onto said recording medium, and a second erasing mode for setting said recording medium in a condition that an information signal having an information amount larger than said first information amount is permitted to be recorded onto said recording medium, said erasing mode setting means setting the apparatus in one of the first erasing mode and the second erasing mode; and control means for regulating a start of each of the operations, respectively, in the first erasing mode and in the second erasing mode in accordance with a power supply status of the power supply.

2. Apparatus according to claim 1, wherein the recording medium comprises a magnetic recording medium.

3. Apparatus according to claim 1, wherein said apparatus is coupleable to a battery power supply.

* * * * *

UNITED STATES PATENT AND TRADEMARK OFFICE
CERTIFICATE OF CORRECTION

PATENT NO. : 6,014,279
DATED : January 11, 2000
INVENTOR(S) : Shigeo Yamagata

Page 1 of 1

It is certified that error appears in the above-identified patent and that said Letters Patent is hereby corrected as shown below:

On the Title Page
Item [56] FOREIGN PATENT DOCUMENTS
"65-51001" should read --62-51001--; and
"1112507" should read --1-112507--.

Figure 5:
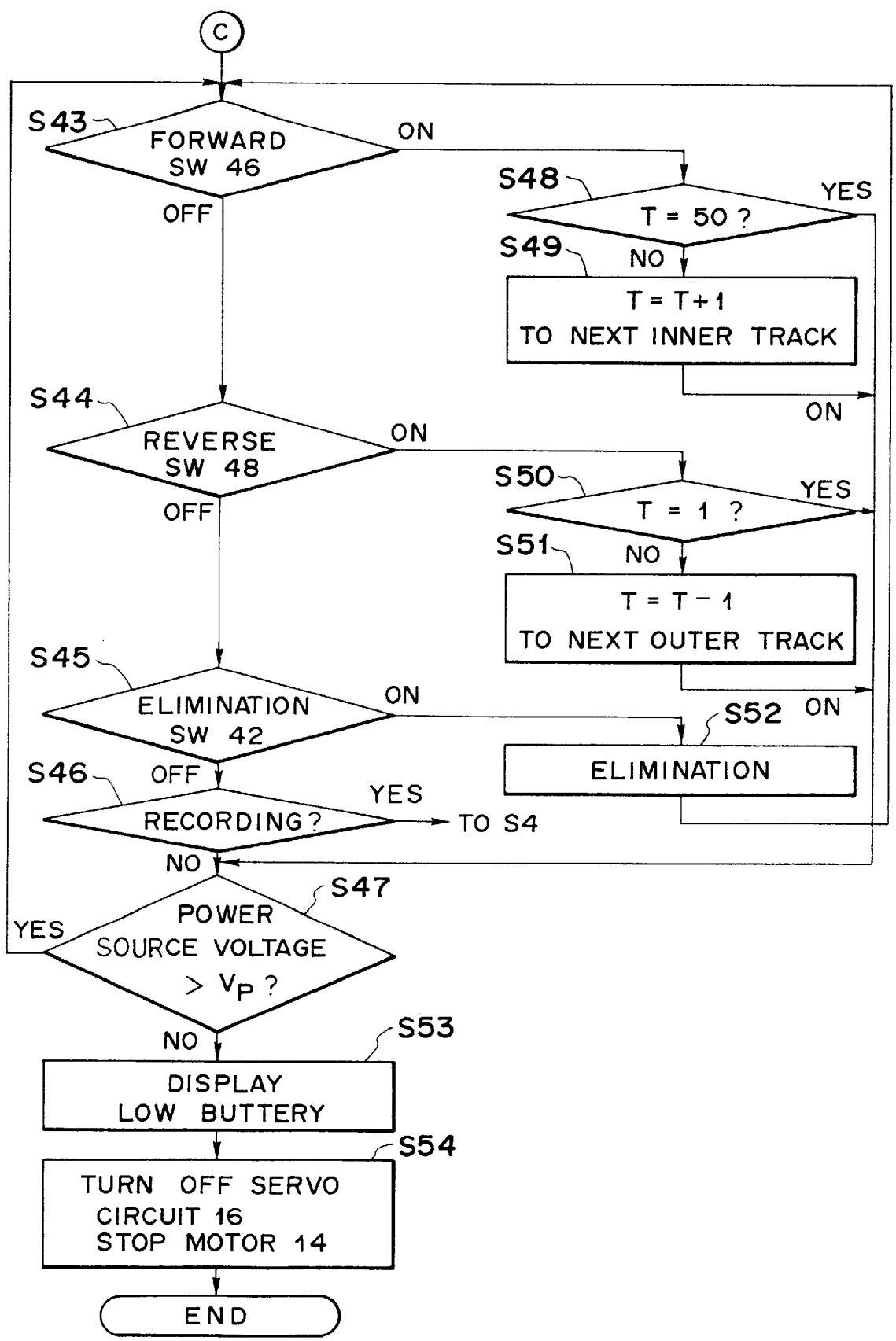

IN THE DRAWINGS
Figure 5, "BUTTERY" SHOULD READ --BATTERY--.

Column 1
Line 59, "in" should read --in a--.

Column 3
Line 25, "and" should read --an--.

Column 4
Line 4, "of" should read --of a--;
Line 31, "of" should read --of a--;

Column 5
Line 19, "not, there" should read --not, there--.

Column 6
Line 15, "of" should read --of an--.

Signed and Sealed this

Nineteenth Day of June, 2001

*Attest:*

NICHOLAS P. GODICI
*Attesting Officer*  Acting Director of the United States Patent and Trademark Office